Figure 1:
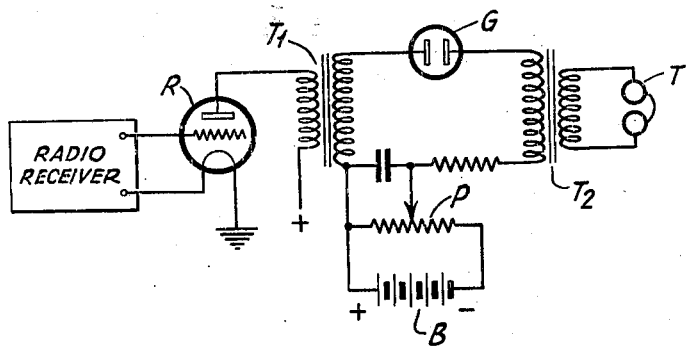

Aug. 30, 1938.    W. BERNDT ET AL    2,128,395
MEASURING INSTRUMENT
Filed May 19, 1937

INVENTORS
W. BERNDT AND H. E. PAUL
BY
ATTORNEY

Patented Aug. 30, 1938

2,128,395

UNITED STATES PATENT OFFICE 2,128,395

MEASURING INSTRUMENT

Walter Berndt and Hans Erich Paul, Berlin, Germany, assignors to Telefunken Gesellschaft für Drahtlose Telegraphie m. b. H., Berlin, Germany, a corporation of Germany Application May 19, 1937, Serial No. 143,491
In Germany July 6, 1936

5 Claims. (Cl. 179—175.31)

For measuring or comparing the output potentials of receivers the moving-coil type of voltmeter in combination with contact or thermo-type rectifiers is used. With equipment of this kind accurate measurements of output potentials in receivers are possible only when the transmitter station being received is sending a permanent dash or else very slow signals. In high-speed transmission, the readings of the measuring instrument are vitiated by the inertia of the needle system and its natural vibration period. By the use of indicator instruments involving a reduced mass such as light-spot instruments, fairly good measurements are still possible when the sequence of signals is slow; but the same difficulties as before mentioned will arise whenever the speed is high as in high-speed telegraphy. Another drawback is that instruments as before mentioned are unhandy and cumbersome in transportation.

The same difficulties are found in the use of the above measuring instruments whenever reception is troubled by fast fading, by atmospheric and other disturbances or when neighboring powerful transmitters break through. Also in the reception of over-modulated telephony transmitter stations, measurement of the output potential in a receiver is not satisfactory with the arrangements known in the art.

Another arrangement designed to measure the output potential of receivers is known in the prior art which is predicated upon the flashing up of a glow-tube for indication. In this instance, the output voltage of the receiver must be at least equal to the glow potential of the glow-tube. If it is higher, then the voltage at the glow-tube is reduced by the aid of a potentiometer to the glow potential. The potentiometer adjustment is then a measure and criterion for the output voltage of the receiver.

However, this scheme involves these drawbacks: For exact measurements, more particularly in the open air, the glow-tube must be very brilliant. This, in the first place, implies a high watt consumption for the outfit. The flow and stopping potentials of glow-tubes, if connected in proper circuits, are quite well defined, though the luminous effect is poor. But the greater the requisite brilliance or luminosity of the glow-tube, the remoter the point of true glow incipiency or ignition, and the greater also the discrepancies between the apparent glow and stopping potentials. If the outside brightness is very great, the eye will perceive the flashing of the glow-tube only with a much greater time lag than, for instance, in a dark room. Hence, accuracy of the measurements is greatly dependent upon the illumination of the ambient.

The arrangement also involves the same drawbacks as the measuring instruments before enumerated, whenever powerful disturbing actions due to other stations or to the atmosphere are present, and this simply on the ground that optical indication is relied upon.

Far more favorable is acoustic indication as used, for instance, in a circuit organization in which the output energy of the receiver is fed to an amplifier tube whose plate circuit contains an acoustic reading or monitor device. By the aid, for instance, of a potentiometer such a high negative bias is impressed upon the tube until the sound from the acoustic reading device disappears, the size of the bias then serving as a measure and criterion for the value of the output potential of the receiver.

But this scheme involves the shortcoming that the characteristic of the tube becomes gradually flatter as the negative biasing voltage grows; the result is that the sound or note does not vanish suddenly, but decreases very gradually. However, this impairs the precision of the listening.

According to the present invention, this drawback is obviated by connecting as an intermediate link between the receiver output and the acoustic device a biased glow-discharge path or a controllable gas discharge tube. The discharge path is first so much biased by the aid of a D. C. voltage that ignition is produced. In the glow state, if the circuit connections have been properly made, this path represents no essential resistance for the incoming signal voltage so that practically normal reception exists in the telephone.

Fig. 1 shows an exemplified embodiment of the invention. By means of transformers $T_1$ and $T_2$ matching is insured between the various inner resistances of the power tube R of the receiver apparatus, the glow-discharge path G and the telephone receiver T. P is the potentiometer connected across the bias battery B.

Figure 2:
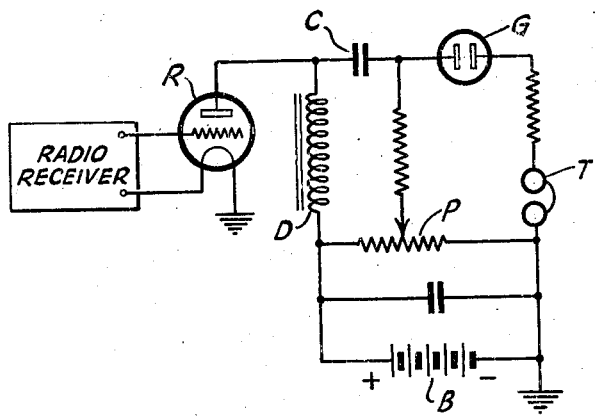

A circuit organization without transformers is shown in Fig. 2 where the biasing voltage is derived from the plate battery B of the receiver and potentiometer P. The audio voltage is developed across iron-cored coil D and transferred through condenser C.

The measurement takes place in the following manner: By reduction of the biasing voltage at the potentiometer P the disappearance of the note in the headset or telephone receiver is ascertained whose voltage is to be determined. Interfering stations which come in with a higher potential will, to be sure, then still be audible, but can aurally be distinguished from the signal to be measured. The more the biasing voltage may be diminished, the higher the output potential of the receiver. Adjustment of the potentiometer furnishing the biasing voltage may be provided with a scale calibrated to read directly in terms of receiver output potential. But it will be found desirable to furnish the calibrated scale with variable zero (null) point adjustment.

The arrangement of the invention particularly makes it feasible to compare receiver output potentials subject to variations with time with a constant output potential from an auxiliary or measuring oscillator. This is the principle underlying most outfits designed to measure the field intensity of transmitter stations. The precision of the measurements, when using a calibrated adjustable auxiliary transmitter or oscillator, is independent of the calibration of the potentiometer furnishing the biasing voltage since it suffices to work at constant potentiometer adjustment without knowing the absolute values of the receiver output potential.

One special advantage residing in the use of a glow-discharge path is that the discharge path requires no additional circuit elements such as a triode tube and that there is no need for a heating source. Hence, in order to measure the output potential of a receiver apparatus, all that is required is a potentiometer and a small glow-discharge path, for the rest of the equipment is already in the receiver itself. Moreover, the glow-discharge path requires but little space so that it may be mounted at any desired place in the interior of the receiver case; hence, the entire measuring outfit may be fitted in any receiver after it has been completed, a feature that has been unattainable in arrangements known in the prior art on account of lack of space. The arrangement hereinbefore described may be used not only in connection with receivers, but also with amplifiers of any kind.

Having described our invention, what we claim and desire to secure by Letters Patent is:

1. A measuring device comprising the combination of an amplifying tube having an output circuit, a sound translating device, a circuit coupling said output circuit and translating device and including a series connected glow discharge tube having two electrodes, a steady source of potential, a resistor connected across the terminals of said potential source and direct current connections between said glow tube electrodes and spaced apart points on said resistor.

2. The method of measuring an alternating current of audio frequency which comprises the steps of transmitting the current through the space between the electrodes of a glow discharge tube, converting the transmitted current into sound waves and applying a steady potential between said electrodes of such value that the total effective voltage therebetween is just sufficient to cause the sound waves to be audible.

3. A measuring device comprising the combination of an amplifying tube having an anode, an input transformer having its primary connected to said anode, an output transformer having primary and secondary windings, a glow discharge tube having one electrode connected to one end of the secondary winding of said input transformer and its other electrode connected to one end of the primary of said output transformer, a circuit including a condenser connecting the other end of the secondary of said input transformer to the other end of the primary of said output transformer, means for applying a variable unidirectional potential between the electrodes of said glow discharge tube and a sound translating device coupled to the secondary winding of said output transformer.

4. An indicating device comprising the combination of an amplifying tube having an anode, an inductance coil having its high potential end connected to said anode, a source of positive potential connected to the low potential end of said inductance, a glow discharge path and a sound translating device connected in series between the high potential end of said coil and the negative terminal of said potential source.

5. An indicating device comprising the combination of an amplifying tube having an anode, an inductance coil having its high potential end connected to said anode, a source of steady potential having its positive terminal connected to the low potential end of said coil, a series circuit comprising a condenser, a glow discharge tube and a sound translating device arranged in the order named connected between said anode and the negative terminal of said potential source, a resistor connected across the terminals of said potential source and a connection between an intermediate point of said resistor and one electrode of said glow discharge tube.

WALTER BERNDT.
HANS ERICH PAUL.